T. E. THOMPSON.
EDUCATIONAL DEVICE.
APPLICATION FILED JAN. 2, 1915.

1,163,184.

Patented Dec. 7, 1915.
2 SHEETS—SHEET 1.

T. E. THOMPSON.
EDUCATIONAL DEVICE.
APPLICATION FILED JAN. 2, 1915.

1,163,184.

Patented Dec. 7, 1915.
2 SHEETS—SHEET 2.

Fig. 4

Primary leaf - Test side - Correct usage

| Those, them | 30 boys and girls | 31 Two, too, to | far, for boys go |
|---|---|---|---|
| Were, was | 30 you in Boston | 31 Have, of | He must come |
| Far, fur, for | 30 means distant | 31 Did, none | It is  It is |

Fig. 5

Primary leaf - Test side - Spelling

| N  r and far | G  t and small |
|---|---|
| B  e and after | F  t and last |
| N  t and day | G  d and bad |

Fig. 6

Primary leaf - Instruction side - Spelling

| Good and bad | Before and after |
|---|---|
| Girl and boy | Near and far |
| Black and white | First and last |

Witnesses:
J. M. Mansfield
Isabel Hall.

Inventor;
Thomas E. Thompson,
by Townsend, Graham + Harris
his attys.

UNITED STATES PATENT OFFICE.

THOMAS E. THOMPSON, OF MONROVIA, CALIFORNIA.

EDUCATIONAL DEVICE.

1,163,184.     Specification of Letters Patent.     Patented Dec. 7, 1915.

Application filed January 2, 1915. Serial No. 295.

*To all whom it may concern:*

Be it known that I, THOMAS E. THOMPSON, a citizen of the United States, residing at Monrovia, in the county of Los Angeles and State of California, have invented a new and useful Educational Device, of which the following is a specification.

My invention relates to the art of education, and the principal object of the invention is to provide an educational device in which the essential features to be taught are accentuated so that the pupils' attention is focused thereon. This object is accomplished by providing a leaf having exercises printed thereon, each of the exercises having a missing part or parts, these missing parts being preferably the essential features to be taught.

A further object of the invention is to provide means in each exercise by which the missing elements may be identified by the pupil. This may be accomplished by the use of identifying data, such as illustrations or definitions, or it may consist of a peculiar arrangement of the exercise itself, or in some cases, as in correct usage exercises, it may consist of the missing elements associated with certain alternative elements which might be incorrectly used in place of the missing element in the exercise. In spelling exercises the identifying data may be antonyms or synonyms of the word to be spelled.

A further object of the invention is to provide a leaf containing on its face exercises with certain parts omitted, and having on its back the same exercises with the missing parts supplied, the exercises on the back being printed in a different order from those on the face, so that the pupil cannot readily locate them when studying or reciting from the obverse side, or when filling in the obverse side when taking a written test.

A further object of the invention is to provide a ready checking means by which the pupil can quickly find the missing element and by which the pupil, teacher, or others, can readily check and correct the essential features filled in by the pupil.

The checking means consists of a secondary leaf which may be laid over the primary leaf and through which all or a portion of the exercises on the test side of the primary leaf are visible, the secondary leaf having the missing parts of the primary leaf printed thereon in such a position that they are immediately adjacent to the proper exercises on the primary leaf when the secondary leaf is properly positioned thereon.

While I have developed my invention to cover nearly all branches of education, including spelling, language, mathematics, geography, history, music, and the other branches, I have illustrated only certain forms, it being obvious that the means described and claimed can be modified to suit the subject taught.

Other objects and advantages will be described and implied in the following, or will be evident to one skilled in the educational art, after a careful study of the forms disclosed herein.

In the drawings, which are for illustrative purposes only: Figure 1 is a view of the test side of a portion of a primary leaf on spelling. Fig. 2 is a view of a portion of the corresponding secondary leaf. Fig. 3 is a view of the leaves shown in Fig. 1 and Fig. 2, as laid together for checking purposes. Fig. 4 is a view of the test side of a portion of a primary leaf on correct usage. Fig. 5 is a view of the test side of a portion of a primary leaf on spelling, and Fig. 6 is a view of the instruction side of the leaf shown in Fig. 5.

In the primary leaf shown in Fig. 1, a series of spelling exercises are shown, each exercise consisting of a word 11, a definition 12, and an illustration 13, in which the word 11 is correctly used, the word 11 having spaces 14 to denote the missing parts or letters which are to be recited or filled in by the pupil. The essential word in the illustration has omitted parts so that the pupil cannot find the correct spelling therefrom. The spaces 14 are all three spaces wide so that the pupil gets no clue from the width of space as to the number of letters required to complete the words 11. The definition 12 and the illustration 13 constitute the identifying data, as by them the pupil can determine what the word is that he is to spell. For example the word t—o is defined as "also", and the example given is "she saw it t—o". It is evident that this identifying data limits the pupil to the word —too—, excluding —two— and —to—. The secondary leaf shown in Fig. 2 consists of a heading portion 15, exhibiting spaces 16, and missing element spaces 17. Printed on the space 17 are the missing elements 18, in this case letters, these elements being printed between lines 19 similarly located and spaced to the lines 20 of the primary leaf of Fig. 1. The exhibiting space 16 may be rendered transparent by waxing, or other treatment, or it may be cut away along the lines 21 and 22. In Fig. 3 the secondary leaf so cut away is shown in place on the primary leaf correctly alined, the space 17 covering the identifying data and the missing element 18 each appearing adjacent to the proper word 14 of the primary leaf, the lines 19 being alined with the lines 20 for this purpose. As ordinarily used the test side of the primary leaf is filled in by the pupil supplying the letters 24. At 25 and 26 are shown words which are misspelled, this misspelling being immediately evident from a comparison with the letters 27 and 28 printed on the secondary leaf.

While the leaves illustrated are primarily intended for use as a written test, and ready correction means therefor, they have other uses. The test sheet can be used for oral recitations, the pupil spelling the words off in order. So far as I am aware this is the only known means by which a pupil can recite in spelling without someone else calling off the words to be spelled. By using these spelling test sheets, recitations in spelling are very rapid, it being possible to hear several pupils in the time required to hear one by the old methods. It is also possible to fix the definition in the pupil's mind at the same time that the spelling is being learned. The secondary leaf may be used not only as a correction means, but it may be used as an instruction means, being given to the pupil so that he can learn his lesson, and being taken away from him while he recites or fills in his test leaf. It is ordinarily used by the teacher to correct written test leaves, but can be similarly used by the pupil or by a visiting principal, superintendent, or parent.

The use of identifying data is not limited to spelling, but may be used in connection with correct usage as shown in Fig. 4. In this figure a series of exercises 30, and a series of identifying data 31 are used, the identifying data in this case consisting of the correct missing element with several alternative elements that are sometimes incorrectly used. The pupil selects the proper word from the identifying data and either recites it, or fills it in in the exercise 30. A secondary leaf may be used in connection with the sheet shown in Fig. 4, the correct missing elements being printed thereon, and the sheets being combined as described in connection with Figs. 1 and 2.

In Fig. 5 another form of spelling test is shown. In this form the pupil infers the word from the fact that it is a part of a catch phrase, being associated with an antonym. For example, the first phrase is evidently "Near and far", the missing elements needed in the space 32 being the letters "e—a". In this case the words "and far" constitute the identifying data. A secondary leaf may be used with this in a similar manner to that already explained.

The primary leaves described may be used either as oral or written test papers, or they may be used in connection with the secondary leaves as instruction papers, the secondary leaves furnishing the missing elements. I prefer, however, to print the exercises complete with the missing elements on the back of the leaf, arranging them in entirely different sequence from the order on the test side. The back or instruction side of the leaf shown in Fig. 5 is shown in Fig. 6. A similar instruction side can be printed on any of the primary leaves shown if desired. It is important that the position of any exercise on the instruction side be widely different from its position on the test side so that the pupil will find it difficult to locate it when the test is being given. It is, of course, obvious that there are certain subjects in which the back may well be left blank. In other subjects, notably geography and history, it is very desirable to make the primary leaf a self contained unit and to use it without text books.

I claim as my invention:—

1. An educational device comprising a leaf having a series of spelling exercises printed thereon, each exercise consisting of the word to be spelled with a letter or letters omitted, in combination with another word or other words by means of which the word to be spelled may be identified by the pupil.

2. An educational device comprising a primary leaf having a series of exercises printed thereon, each exercise having a part omitted, and said exercise being associated with identifying data by which the omitted part can be identified by the pupil.

3. An educational device comprising a primary leaf having a series of exercises printed thereon, each exercise having a part omitted, and said exercise being associated with a definition by which the omitted part can be identified by the pupil.

4. An educational device comprising a primary leaf having a series of exercises printed thereon, each exercise having a part omitted, and said exercise being associated with an illustration by which the omitted part can be identified by the pupil.

5. An educational device comprising a primary leaf having a series of exercises printed thereon, each exercise having a part omitted, and said exercise being associated with identifying data by which the omitted part can be identified by the pupil; in combination with a secondary leaf adapted to register with said primary leaf, said secondary leaf having exhibiting spaces through which the exercises of the primary leaf may be seen, and said secondary leaf having the missing elements printed thereon in such a position that they are preferably adjacent to the proper exercises on the primary leaf when the secondary leaf is properly registered on the primary leaf.

6. An educational device comprising a primary leaf having a series of exercises printed thereon, each exercise having a part omitted, and said exercise being associated with a definition by which the omitted part can be identified by the pupil; in combination with a secondary leaf adapted to register with said primary leaf, said secondary leaf having exhibiting spaces through which the exercises of the primary leaf may be seen, and said secondary leaf having the missing elements printed thereon in such a position that they are preferably adjacent to the proper exercises on the primary leaf when the secondary leaf is properly registered on the primary leaf.

In testimony whereof, I have hereunto set my hand at Los Angeles, California, this 24th day of December, 1914.

THOMAS E. THOMPSON.

In presence of—
P. H. SHELTON,
F. M. TOWNSEND.

Copies of this patent may be obtained for five cents each, by addressing the "Commissioner of Patents, Washington, D. C."